(12) United States Patent
Durali et al.

(10) Patent No.: US 7,863,384 B2
(45) Date of Patent: Jan. 4, 2011

(54) FLUOROPOLYMERS HAVING IMPROVED WHITENESS

(75) Inventors: Mehdi Durali, West Chester, PA (US); Ramin Amin-Sanayei, Collegeville, PA (US); Saeid Zerafati, Villanova, PA (US)

(73) Assignee: Arkema Inc., Philadelphia, PA (US)

( * ) Notice: Subject to any disclaimer, the term of this patent is extended or adjusted under 35 U.S.C. 154(b) by 292 days.

(21) Appl. No.: 12/299,023

(22) PCT Filed: Mar. 28, 2007

(86) PCT No.: PCT/US2007/065325
§ 371 (c)(1),
(2), (4) Date: Oct. 30, 2008

(87) PCT Pub. No.: WO2007/130757
PCT Pub. Date: Nov. 15, 2007

(65) Prior Publication Data
US 2009/0069488 A1    Mar. 12, 2009

Related U.S. Application Data

(60) Provisional application No. 60/796,408, filed on May 1, 2006.

(51) Int. Cl.
*C08L 27/12* (2006.01)
(52) U.S. Cl. ..................................................... 525/199
(58) Field of Classification Search ................... 525/199
See application file for complete search history.

(56) References Cited

U.S. PATENT DOCUMENTS

| | | | |
|---|---|---|---|
| 3,781,265 A | 12/1973 | Dohany | |
| 4,904,726 A * | 2/1990 | Morgan et al. | 524/520 |
| 6,187,885 B1 | 2/2001 | Barber | |
| 6,743,865 B2 * | 6/2004 | Mekhilef et al. | 525/199 |
| 6,803,416 B2 | 10/2004 | Schultes et al. | |
| 7,195,853 B1 | 3/2007 | Pickering et al. | |
| 2004/0225096 A1 | 11/2004 | Kappler et al. | |

* cited by examiner

*Primary Examiner*—Nathan M Nutter
(74) *Attorney, Agent, or Firm*—Thomas F. Roland

(57) ABSTRACT

The present invention relates to the preparation of a fluoropolymer exhibiting improved whiteness upon fabrication. The fluoropolymer is a multiphase copolymer or blend of fluropolymers. Fluoropolymer compositions of this invention could have application in both melt processing and solvent casting operations for such products as pipes, tubes, sheets, rods, solvent-casted and melt-processed films.

12 Claims, No Drawings

FLUOROPOLYMERS HAVING IMPROVED WHITENESS

This application claims benefit, under U.S.C. §119 or §365 of U.S. Provisional Application No. U.S. 60/796,408, filed May 1, 2006; and PCT/US2007/065325, filed Mar. 28, 2007.

FIELD OF THE INVENTION

The present invention relates to the preparation of a fluoropolymer exhibiting improved whiteness upon fabrication. The fluoropolymer is a multiphase copolymer or blend of fluropolymers. Fluoropolymer compositions of this invention could have application in both melt processing and solvent casting operations for such products as pipes, tubes, sheets, rods, solvent-casted and melt-processed films.

BACKGROUND OF THE INVENTION

Flouropolymers are melt-processable resins that are formed into polymer structures by many different processes, such as extrusion, injection molding, fiber spinning, extrusion blow molding and blown film. They are also used as polymer processing aids due to their low surface energies and phase behaviors.

Flouropolymers, and especially polyvinylidene fluoride polymers and copolymers often have a white color. In the manufacture of fluoropolymer articles, thermoforming processes are often used, which often lead to undesirable discoloration of the fluoropolymer in the final product.

Several methods have been proposed to reduce discoloration of fluoropolymers during the processes for manufacturing articles. U.S. Pat. No. 3,781,265 describes the synthesis of poly (vinylidene fluoride) resin having good thermal stability by polymerizing VDF in suspension using diisopropyl peroxydicarbonate as the initiator and 1,1,2-trichlorotrifluoroethane as the polymerization accelerator. The synthesis of heat resistant PVDF by an emulsion process using ammonium persulfate as the initiator and methyl/ethyl acetate as the Chain transfer agent is reported in JP 58065711.

The use of special chain transfer agents has been reported to provide improved whiteness in PVDF synthesis, such as trichlorofluoromethane in U.S. Pat. No. 4,569,978 emulsion polymerization; Dialkyl ethers in JP 01129005 suspension polymerization; ethane in emulsion polymerization in U.S. Pat. No. 6,649,720; and HCFC-123 in emulsion polymerization in EP 655468.

U.S. Pat. No. 6,187,885 describes improved color using copolymerization of vinylidene fluoride (VDF) with hexafluoropropylene (HFP). According to this invention 1-20% HFP was added when 50-90% of VDF was already charged into the polymerization reactor.

EP 816397 describes improved resistance to heat-induced color distortion by a reduction of impurities, using a perfluoropolyether as the surfactant.

Suspension polymerization of VDF using organic peroxide initiators has been reported in JP 02029402. The application claims that pH treatment of the reaction mixture with NaOH yielded a milky white product that was resistant to discoloration at high temperatures.

Post-treatment of the fluoropolymer with sodium acetate for improved resistance to discoloration is described in US 2004225096.

Surprisingly it has been found that a fluoropolymer composition can be produced having excellent whiteness even after melt processing, by producing a multi-phase composition having a polyvinylidene fluoride continuous phase and a non-continuous phase having an average domain size of 20-900 nm, and a refractive index mismatch of between 0.007 and 0.07 between the phases.

SUMMARY OF THE INVENTION

The invention relates to a multiphase polyvinylidene fluoride composition comprising two phases consisting of:
  a) 70 to 99.0 weight percent of a polyvinylidene fluoride polymer continuous phase; and
  b) 1.0 to 30 weight percent of a non-continuous fluoropolymer phase wherein the non-continuous phase has a Refractive Index (RI) of from 0.007 to 0.07 below the RI of the continuous phase, and wherein the average domain size of the non-continuous phase is in the range of from 10-1000 nm.

The invention also relates to process for forming a two-phase polyvinylidene fluoride composition comprising the steps of
  a) introducing into a reactor a first vinylidene fluoride monomer feed, and
  b) introducing a second monomer feed into said reactor at a point after at least 90 percent by weight of the continuous phase monomers feed has been added to form a second distinct polymer phase, wherein said two-phase polyvinylidene fluoride composition comprises 70 to 99.0 weight percent of a continuous phase; and 1.0 to 30 weight percent of a non-continuous phase, and wherein the non-continuous phase has a Refractive Index (RI) of from 0.007 to 0.07 below the RI of the continuous phase, and wherein the average domain size of the non-continuous phase is in the range of from 10-1000 mm.

DETAILED DESCRIPTION OF THE INVENTION

The invention relates to a multi-phase fluoropolymer composition exhibiting a high level of whiteness after heat processing, and for methods of producing the fluoropolymer.

The fluoropolymer composition of the invention is a multiphase composition containing two distinct phases, a continuous polyvinylidene fluoride polymer matrix, and a discontinuous phase.

The continuous phase matrix polymer is a vinylidene fluoride polymer. The term "vinylidene fluoride polymer" used herein includes both normally solid, high molecular weight homopolymers and copolymers within its meaning. Such copolymers include those containing at least 50 mole percent of vinylidene fluoride copolymerized with at least one comonomer selected from the group consisting of tetrafluoroethylene, trifluoroethylene, chlorotrifluoroethylene, hexafluoropropene, vinyl fluoride, pentafluoropropene, perfluoromethyl vinyl ether, perfluoropropyl vinyl ether and any other monomer that would readily copolymerize with vinylidene fluoride. Particularly preferred are copolymers composed of from at least about 70 and up to 99 mole percent vinylidene fluoride, and correspondingly from 1 to 30 percent tetrafluoroethylene, such as disclosed in British Patent No. 827,308; about 70 to 99 percent vinylidene fluoride and 1 to 30 percent hexafluoropropene (see for example U.S. Pat. No. 3,178,399); and about 70 to 99 mole percent vinylidene fluoride and 1 to 30 mole percent trifluoroethylene. Terpolymers of vinylidene fluoride, hexafluoropropene and tetrafluoroethylene such as described in U.S. Pat. No. 2,968,649 and terpolymers of vinylidene fluoride, trifluoroethylene and tetrafluoroethylene are also representatives of the class of vinylidene fluoride copolymers which can be used as the continuous phase polymer matrix.

The non-continuous phase of the polymer composition is one in which the average domain size is in the range of from 10-1000 nm, preferably 20-900, more preferably 30-800. The non-continuous phase will have a Refractive Index (RI) that is different from that of the matrix polyvinylidene fluoride polymer by from 0.007 to 0.07, preferably 0.009-0.07. In general, the RI of the non-continuous phase will be lower than that of the polyvinylidene fluoride matrix.

The non-continuous phase will make up from 1.0 to 30 weight percent of the multiphase copolymer, preferably 2-30, while the continuous phase makes up from 70-99 weight percent, and preferably 70-98 weight percent of the multiphase polymer.

The multiphase polymer composition of the invention may be formed by two main methods: sequential copolymerization and blending. The contrast between the two phases regardless of the method of preparation (blending or synthesis) would create a whiter resin.

In the case of sequential co-polymerization, the polymer is formed by synthesizing the matrix polymer in a typical fashion for forming a polyvinylidene fluoride polymer, as known to one of skill in the art. This can be by an emulsion, solution or suspension polymerization. At a point in the polymerization after at least 90 percent, preferably 92 percent, and more preferably 95 percent of the continuous phase monomer/monomers have been added, a second monomer feed is introduced into the reactor. The second monomer feed can be a single monomer or a mixture of monomers capable of homopolymerizing or copolymerizing with the first component monomers. The second monomer feed creates a polymer generating a separate phase dispersed in the polymer matrix of the first phase.

The discontinuous phase can be formed from any monomer or monomers that capable of copolymerizing with the first component monomers. These include vinylidene fluoride mixed with other fluoropolymers, such as those described under the preceding definition of vinylidene fluoride polymer, and even containing small amounts of other monomers known to polymerize or be compatible with fluoromonomers.

In one embodiment, the multiphase polymer is formed by emulsion process in which a reactor is charged with deionized water, water-soluble surfactant capable of emulsifying the reactant mass during polymerization and paraffin antifoulant. The mixture is stirred and deoxygenated. A predetermined amount of chain transfer agent is then introduced into the reactor, the reactor temperature raised to the desired level and vinylidene fluoride (VDF) or VDF combined with other fluoromonomers fed into the reactor. Once the initial charge of monomer/monomers is introduced and the pressure in the reactor has reached the desired level, an initiator emulsion/solution is introduced to start the polymerization reaction. The temperature of the reaction can vary depending on the characteristics of the initiator used and one of skill in the art will know how to do so. Typically the temperature will be from about 60° to 120° C., preferably from about 70° to 110° C.

Similarly, the polymerization pressure may vary, but, typically it will be within the range 40 to 50 atmospheres. Following the initiation of the reaction, the monomer/monomers are continuously fed along with additional initiator to maintain the desired pressure. Once the desired amount of major component polymer has been reached in the reactor (greater than 90% of the continuous phase monomer/monomers fed), the monomer/monomers of the minor component (forming the discontinuous phase) will be introduced into the reactor. These monomers are generally charged as a slug into the reactor at the maximum feed rate. Once the feed of the minor phase monomers is complete, initiator feed rate will be increased for a set period of time to facilitate polymerization of these monomers. All feeds will then be stopped. Residual gases (containing unreacted monomers) are vented and the latex recovered from the reactor. The polymer may then be isolated from the latex by standard methods, such as, acid coagulation, freeze thaw or high shear.

In one preferred embodiment, a polyvinylidene fluoride homopolymer is formed as the continuous phase, followed after at least 90 percent of the total monomer is charged by the introduction of a monomer mixture of vinylidene fluoride and hexafluoropropane (HFP). The level of HFP in the second monomer mixture is up to 30 weight percent of the second monomer feed, preferably up to 25 weight percent, and more preferably up to 20 weight percent. If a 30 weight percent HFP monomer mixture is added just after 90 percent of the total monomer has been fed to the reactor, the resulting copolymer will have a total of 10 weight percent of HFP monomer units, which will be concentrated in a second, discontinuous phase.

In addition to formation by a copolymerization process, the multiphase composition of the inventgion may also be formed by blending a polyvinylidene fluoride polymer with another fluoropolymer which may be a homopolymer, copolymer or terpolymer. The blending of the two polymers may be in the form of a melt blending, solution blending or latex blending. Melt blending can be done with powders or pellets which must be extruded to form a homogeneous blend, with powders being preferred.

While not being bound by any particular theory, it is believed that the matrix continuous phase will be crystalline, and the second phase will be much less crystalline, resulting in the formation of a distinct separate discontinuous phase.

The multi-phase fluoropolymer of the invention shows excellent whiteness after heat processing. Upon heat aging or after melt processing, the resin of this invention will exhibit a whiteness improvement, $\Delta YI$, of greater than 4 units relative to virgin resin (polymer), as measured by a spectrophotometer.

The polymer composition of the invention may also contain one or more additives typically added to fluoropolymer compositions. Such additives include, but are not limited to, pigments, dyes, fillers, surfactants, antioxidants, heat stabilizers, and other polymers miscible with PVDF.

The multi-phase polymer of the present invention is especially useful in forming articles by heat processing methods in which a highly white color is desired. Some of the articles that can be advantageously be made from the composition of the invention include, but are not limited to Pipes, fittings and valves; pump assemblies; sheet and stock shapes; films; tubing; tanks and vessels; nozzles; membranes and filter housing; powder coatings; and foams.

EXAMPLES

Comparative Example 1

The following comparative example is based on the teachings of U.S. Pat. No. 6,187,885 B1. Into an 80-gallon stainless steel reactor was charged, 345 lbs of deionized water, 225 grams ammonium perfluorodecanoate and 6 grams of paraffin wax. Following evacuation, agitation was begun at 23 rpm and the reactor was heated to 82° C. After reactor temperature reached the desired set point, 0.44 lbs propane was charged into the reactor. Reactor pressure was then raised to 650 psi by charging about 40 lbs VDF into the reactor. After reactor pressure was stabilized, 5.25 lbs of an NPP (di-N-propyl peroxydicarbonate) emulsion was added to the reactor to initiate polymerization. The initiator emulsion was 3.0 wt. % NPP in deionized water containing 0.2 wt. % ammonium perflorodecanoate. The rate of further addition of the NPP emulsion was adjusted to obtain and maintain a VDF polymerization rate of roughly 70 pounds per hour. The VDF homopolymerization was continued until approximately 150 pounds VDF was introduced in the reaction mass. Thereafter, 10 pounds HFP was pumped into the reactor at a rate of approximately 70 pounds/hour, while the VDF feed was continued. The fast introduction of fairly slow reacting HFP monomer temporarily slowed the reaction rate. The initiator addition rate was adjusted to restore the polymerization rate back to 70 pounds/hour. The reaction continued until a total 210 pounds of VDF had been added to the reaction mass. The VDF feed was stopped and the batch was allowed to react-out at the reaction temperature and by feeding initiator to consume residual monomer at decreasing pressurer. After 20 minutes, the agitation was stopped and the reactor was vented and the latex recovered. Polymer resin was isolated by coagulating the latex, washing the latex with deionized water, and drying. The resin had a melt viscosity of 21.7 kilopoise measured at 232° C. and 100 sec$^{-1}$ (ASTM D3835), a DSC melt point of 140-145° C. and a 10 min plaque Delta YI of 5.3.

Example 1

Into an 80-gallon stainless steel reactor was charged, as in the manner of the comparative example 1, 345 lbs of deionized water, 225 grams ammonium perfluorodecanoate and 6 grams of paraffin wax. Following evacuation, agitation was begun at 23 rpm and the reactor was heated to 82° C. After reactor temperature reached the desired set point, 0.44 lbs propane was charged into the reactor. Reactor pressure was then raised to 650 psi by charging about 40 lbs VDF into the reactor. After reactor pressure was stabilized, 5.25 lbs of an NPP (di-N-propyl peroxydicarbonate) emulsion was added to the reactor to initiate polymerization. The initiator emulsion was 3.0 wt. % NPP in deionized water containing 0.2 wt. % ammonium perflorodecanoate. The rate of further addition of the NPP emulsion was adjusted to obtain and maintain a VDF polymerization rate of roughly 70 pounds per hour. The VDF homopolymerization was continued until all the VDF monomer (approximately 202 pounds) was introduced in the reaction mass. Thereafter, 17.6 pounds HFP was pumped into the reactor at a rate of approximately 70 pounds/hour. The fast introduction of fairly slow reacting HFP monomer temporarily slowed the reaction rate. The initiator addition rate was increased for 15 min and then restored at normal rate and the batch was allowed to react-out at the reaction temperature and at decreasing pressurer. After 20 minutes, the agitation was stopped and the reactor was vented and the latex recovered. Polymer resin was isolated by coagulating the latex, washing the latex with deionized water, and drying. The resin had a melt viscosity of 25.3 kilopoise measured at 232° C., a DSC melt point of 163-168° C. and a 10 min plaque Delta YI of 14.6.

Example 2

The procedure of example 1 was repeated except that 26.4 pounds HFP was pumped into the reactor at a rate of approximately 70 pounds/hour. The resulting resin displayed a melt viscosity of 21.7 kilopoise measured at 232° C. and a 10 min plaque Delta YI of 16.8.

Example 3

The procedure of example 1 was repeated except that 4.4 lbs HFP was pumped into the reactor at a rate of approximately 70 pounds/hour. The resulting resin displayed a melt viscosity of 25.2 kilopoise measured at 232° C. and a 10 min plaque Delta YI of 7.3.

Example 4

The procedure of example 1 was repeated except that 13.2 lbs HFP was pumped into the reactor at a rate of approximately 70 pounds/hour and the initiator feed at increased rate was continued for 30 min. The resulting resin displayed a melt viscosity of 28.8 kilopoise measured at 232° C.

Example 5

The procedure of example 1 was repeated except that 8.8 lbs HFP was pumped into the reactor at a rate of approximately 70 pounds/hour and the initiator feed at increased rate was continued for 45 min. The resulting resin contained 1.7 wt. % HFP measured by solution-state $^{19}$F NMR, displayed a melt viscosity of 28.8 kilopoise measured at 232° C. and a 10 min plaque Delta YI of 5.4.

Example 6

The procedure of example 5 was repeated except that HFP was introduced into the reactor at a rate of approximately 70 pounds/hour after reactor pressure dropped to 550 psi. The resulting resin displayed a melt viscosity of 13.32 kilopoise measured at 232° C.

Example 7

The procedure of example 5 was repeated except that HFP was introduced into the reactor at a rate of approximately 70 pounds/hour after reactor pressure dropped to 450 psi. The resulting resin contained 1.4% HFP measured by $^{19}$F NMR, displayed a melt viscosity of 22.7 kilopoise measured at 232° C. and a 10 min plaque Delta YI of 6.5.

Example 8

The procedure of example 7 was repeated except that 2.2 pounds HFP was introduced into the reactor at a rate of approximately 70 pounds/hour.

Example 9

The procedure of example 7 was repeated except that propane was replaced with 1.3 lbs ethyl acetate and the initiator increased feed rate period was reduced to 23 min. The resulting resin displayed a melt viscosity of 16.69 kilopoise measured at 232° C.

Example 10

The procedure of example 9 was repeated except that HFP was introduced into the reactor at a rate of approximately 70 pounds/hour after reactor pressure dropped to 300 psi. The resulting resin displayed a melt viscosity of 17.26 kilopoise measured at 232° C.

What is claimed is:
1. A multiphase polyvinylidene fluoride composition comprising two phases consisting of:

a) 70 to 99.0 weight percent of a polyvinylidene fluoride polymer continuous phase; and b) 1.0 to 30 weight percent of a non-continuous fluoropolymer phase wherein the non-continuous phase has a Refractive Index (RI) of from 0.007 to 0.07 below the RI of the continuous phase, and wherein the average domain size of the non-continuous phase is in the range of from 10-1000 nm.

2. The polyvinylidene fluoride composition of claim 1, wherein the continuous phase is a polyvinylidene fluoride homopolymer.

3. The polyvinylidene fluoride composition of claim 1, wherein the continuous phase is a copolymer of 70 to 99 weight percent of vinylidene fluoride units and 1 to 30 percent of tetrafluoroethylene, hexafluoropropane, or trifluoroethylene monomer units, or a mixture thereof.

4. The polyvinylidene fluoride composition of claim 1, wherein said non-continuous phase average domain size of 20-900.

5. The polyvinylidene fluoride composition of claim 1, wherein the RI difference is from 0.009 to 0.07.

6. The polyvinylidene fluoride composition of claim 1, comprising 70-98 weight percent of polyvinylidene fluoride polymer continuous phase and 2-30 weight percent of said non-continuous phase.

7. The polyvinylidene fluoride composition of claim 1 further comprising one or more additives selected from the group consisting of pigments, dyes, fillers, surfactants, antioxidants, heat stabilizers, and other polymers miscible with polyvinylidene fluoride.

8. The polyvinylidene fluoride composition of claim 1, wherein said average domain size of the non-continuous phase is in the range of from 30-800 nm.

9. A process for forming a two-phase polyvinylidene fluoride composition comprising the steps of
a) introducing into a reactor a first vinylidene fluoride monomer feed, and
b) introducing a second monomer feed into said reactor at a point after at least 90 percent by weight of the continuous phase monomers feed has been added to form a second distinct polymer phase,
wherein said two-phase polyvinylidene fluoride composition comprises 70 to 99.0 weight percent of a continuous phase; and 1.0 to 30 weight percent of a non-continuous phase, and wherein the non-continuous phase has a Refractive Index (RI) of from 0.007 to 0.07 below the RI of the continuous phase, and wherein the average domain size of the non-continuous phase is in the range of from 10-1000 nm.

10. The process of claim 9, wherein said second monomer feed is introduced into the reactor a point after at least 92 percent by weight of the continuous phase monomers feed has been added.

11. The process of claim 9, wherein said second monomer phase comprises 2-30 weight percent of hexafluoropropane, and 70-98 weight percent of vinylidene fluoride.

12. A process for forming a two phase polyvinylidene fluoride composition comprising the steps of blending two polymer to form two-phase polyvinylidene fluoride composition comprises 70 to 99.0 weight percent of a continuous phase; and 1.0 to 30 weight percent of a non-continuous phase, and wherein the non-continuous phase has a Refractive Index (RI) of from 0.007 to 0.07 below the RI of the continuous phase, and wherein the average domain size of the non-continuous phase is in the range of from 10-1000 nm.

* * * * *